(12) United States Patent
Deligne et al.

(10) Patent No.: US 6,754,623 B2
(45) Date of Patent: Jun. 22, 2004

(54) METHODS AND APPARATUS FOR AMBIENT NOISE REMOVAL IN SPEECH RECOGNITION

(75) Inventors: Sabine Deligne, White Plains, NY (US); Nagendra K. Goel, McLean, VA (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 09/774,487

(22) Filed: Jan. 31, 2001

(65) Prior Publication Data

US 2002/0138263 A1 Sep. 26, 2002

(51) Int. Cl.[7] .............................................. G10L 11/02

(52) U.S. Cl. ...................................... 704/233; 704/226

(58) Field of Search ................................ 704/233, 226, 704/228, 238, 227; 381/94.7, 71.1

(56) References Cited

U.S. PATENT DOCUMENTS

| 5,940,792 | A | * | 8/1999 | Hollier | 704/228 |
| 5,953,699 | A | * | 9/1999 | Takagi | 704/238 |
| 6,289,309 | B1 | * | 9/2001 | deVries | 704/233 |
| 6,480,823 | B1 | * | 11/2002 | Zhao et al. | 704/226 |
| 6,496,795 | B1 | * | 12/2002 | Malvar | 704/203 |
| 6,549,630 | B1 | * | 4/2003 | Bobisuthi | 381/94.7 |

OTHER PUBLICATIONS

E. Weinstein et al., "Multi-channel signal separation by decorrelation", IEEE Transactions on Speech and Audio Processing, vol. 1, No. 4, Oct. 1993.

* cited by examiner

Primary Examiner—Susan McFadden
(74) Attorney, Agent, or Firm—Ference & Associates

(57) ABSTRACT

Methods and apparatus for enhancing the accuracy and efficacy of speech recognition in an environment, such as the interior of an automobile or home, in which there may be significant ambient noise, such as music from loudspeakers within an automobile or programming from a television within a home.

15 Claims, 1 Drawing Sheet

METHODS AND APPARATUS FOR AMBIENT NOISE REMOVAL IN SPEECH RECOGNITION

FIELD OF THE INVENTION

The present invention relates to speech recognition, particularly in environments such as automobile interiors or inside homes, where ambient or environmental noise (such as from sound-generating electronic devices) may present a problem for speech recognition.

BACKGROUND OF THE INVENTION

Speech recognition can be employed to perform various non-critical tasks inside an automobile, or at home. For example, in either environment, speech recognition could be utilized in increasing or decreasing the volume of a music system, tuning to a radio channel, or dialing a phone number using voice command. However, the performance of speech recognizers in such situations is usually limited by several factors. Primarily, since it is generally inconvenient to place a microphone very close to the mouth of a person whose speech is to be recognized, the microphones will be prone to pick up ambient sounds as well. These sounds could come from any of a wide variety of sources, such as music from a car radio or cassette player or CD within the car, or from a television in the home.

Accordingly, a need has oft been recognized in connection with suppressing or removing ambient sounds from speech that is to be recognized, to thus enhance the performance of the speech recognizer that processes the speech input. Previously, microphone arrays have been used towards this purpose (such as those manufactured by Andrea Electronics of Melville, N.Y.) by enhancing speech input and suppressing ambient noises. A general discussion on the function of microphone arrays can be found in R. A. Monzingo and T. W. Miller., *Introduction to Adaptative Arrays* (John Wiley and Sons, New York; Wiley Interscience Publications, 1980). However, it has been found that the effectiveness of such arrangements is often limited. Thus, a need has also been recognized in connection with improving upon the performance of such microphone arrays.

SUMMARY OF THE INVENTION

The present invention, in accordance with at least one presently preferred embodiment, is directed towards removing ambient noise from speech signals that are typically acquired through a microphone.

In one aspect, the invention involves:

(1) Capturing the speech signal through a microphone, and optionally converting it to digital form using an A/D converter.

(2) Capturing the unwanted sources of noise or music signal (that are picked up by the microphone as well) in its pure form, and optionally converting them into digital form using an A/ID converter.

(3) Applying a filter to each of the unwanted signals, to get the estimated unwanted signal that would be picked up by the microphone.

(4) Subtracting the estimates of the unwanted signals from the microphone signal, to get a clean speech signal that has almost no unwanted signal.

(It should be noted that since, in speech recognition, the software [or other medium, such as an electronic chip] usually analyzes not the speech signal itself, but certain "features" or "parameters" of the speech signal, it is conceivable to provide a scheme in which, instead of applying step 3 above, one would transform the original speech into features, [such as filterbank energies] and then apply step 4 in the transformed feature space.)

In another aspect, the step of applying a filter to each of the unwanted signals may comprise the steps of:

(1) Artificially creating an environment where only one of the unwanted sources is present, and in which there is no speech. Both the microphone signal, and the source signal are captured and stored for a certain length of time. This process is repeated for all the potential sources (for example the four speakers of the car stereo system). If there is a control on the nature of the noise source (e.g. if it is through a loudspeaker), preferably, white noise is preferred.

(2) Adaptive filter estimation techniques, such as Least Mean Square (LMS), or Recursive Least Squares (RLS) or their variants such as NLMS, or sub-band LMS are used to estimate filter parameters for each of the noise source.

(3) An optional step of incrementally modifying all the filter parameters while the system is operational, and removing noise from the microphone pickup.

In one aspect, the present invention provides an apparatus for providing speech recognition, the apparatus comprising: a first input medium which receives speech input; at least one second input medium which receives ambient input from at least one source separate from the speech input; and an arrangement for reconciling the speech input with the ambient input so as to provide clean speech output.

In another aspect, the present invention provides a method of providing speech recognition, the method comprising the steps of: receiving speech input; receiving ambient input from at least one source separate from the speech input; and reconciling the speech input with the ambient input so as to provide clean speech output.

Furthermore, in another aspect, the present invention provides a program storage device readable by machine, tangibly embodying a program of instructions executable by the machine to perform method steps for providing speech recognition, the method comprising the steps of: receiving speech input; receiving ambient input from at least one source separate from the speech input; and reconciling the speech input with the ambient input so as to provide clean speech output.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
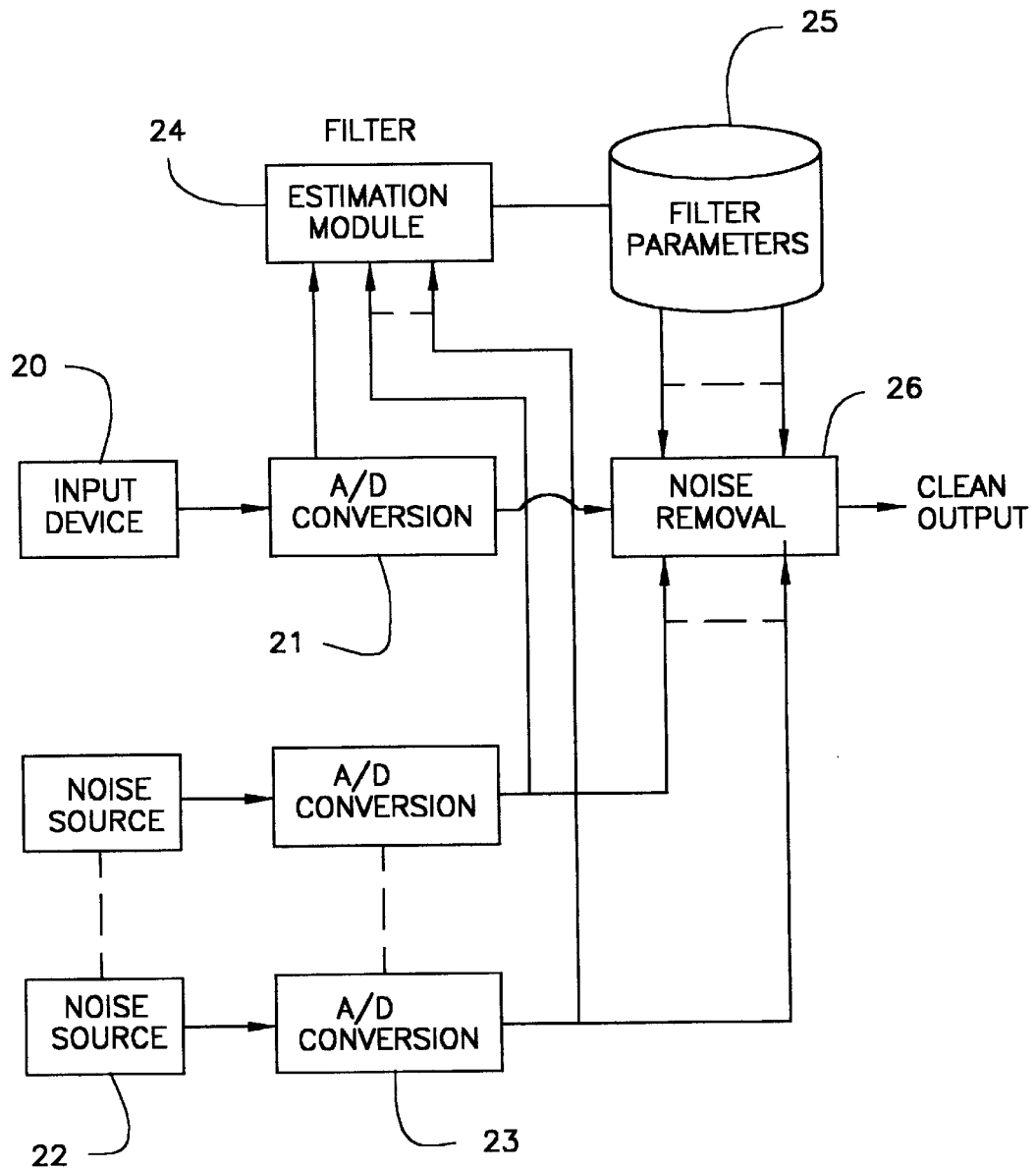
FIG. 1 illustrates an arrangement for providing speech recognition via reconciling the speech input with any ambient noise.

FIG. 1 illustrates an arrangement for removing ambient noise (such as music) from the digitized speech input. As shown in FIG. 1, the speech signal is collected from an input device (20), which could be a single microphone or a microphone array. It is preferably digitized using an A/D converter (21). Similarly, an electrical signal from each of the noise sources (e.g., speakers in an automobile) (22) could preferably digitized using one or more analog-to-digital converters (23) (for instance, a different A/ID converter [23] could correspond to each of the noise sources [22]). While it is conceivable to use microphones or the like to collect input from the noise sources (22), such input is preferably taken directly from the noise sources, e.g., through the wiring associated with the noise sources (22).

For the purposes of further illustration, the speech signal (with ambient music) may be represented as S(n), where n is the time index. Similarly, the music signal alone may be represented as, $m_i(n)$, where i is the index of the noise sources (e.g., 1 ... 4 loudspeakers in a car corresponding to left-front, right-front, left-rear and right-rear). In order to remove the ambient noise (such as music) from speech, filters $h_i(n)$ (where i is the index of the noise source) are preferably estimated first, using a filter estimation module (24).

Consequently, the clean signal C(n) can be written as $$C(n) = S(n) - \sum_{i=1}^{I} \sum_{k=0}^{O_i-1} h_i(k) m_i(n-k) \qquad (1)$$

where $O_i$ is the order of the filter $h_i$.

The following method is preferably used to estimate $h_i(n)$. For each of the sources i, all sources except the i'th one are turned off. Then noise (such as music) is propagated through the i'th speaker and the signals $m_i(n)$ and $S_i(n)$ are collected. At this time, attention is paid to make sure that there is no other significant active source of sound in the car.

Then, standard adaptive filter techniques are preferably used to model $$\hat{S}_i(n) = \sum_{k=0}^{O_i-1} h_i(n) m_i(n-k) \qquad (2)$$

$O_i$ and $h_i$ are preferably chosen so as to minimize the difference between $S_i(n)$ and $\hat{S}_i(n)$. If the mean of the square of the difference in each of the signal values (mean squared distance) is used as a measure, the popular least mean squares (LMS) adaptation technique or any of its variants can be used. (See Ehud Weinstein, Meir Feder and Alan V. Oppenheim, "Multi-channel signal separation by decorrelation", IEEE transactions on Speech and Audio Processing vol. 1, num. 4, October 1993.)

Once the filter parameters have been computed, they are preferably stored in an appropriate storage medium (25) for later use. At that time, when noise removal is deemed necessary, the noise removal module (26) is used, which invokes Equation 1, to remove the nuisance noise from the signal.

It should be appreciated that the present invention, in accordance with at least one embodiment, need not be restricted to the specific examples discussed hereinabove. Essentially, the reconciliation of ambient noise, as broadly contemplated herein, may be applied in any environment where there may be a need to undertake speech recognition and in which there may be undesirable ambient noise such as, for example, in a retail establishment or shopping mall.

It is to be understood that the present invention, in accordance with at least one presently preferred embodiment, includes a first input medium which receives speech input, at least one second input medium which receives ambient input from at least one source separate from the speech input, and an arrangement for reconciling the speech input with the ambient input so as to provide clean speech output. Together, the first input medium, at least one second input medium and reconciling arrangement may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for providing speech recognition, said apparatus comprising:
    a first input medium which receives speech input;
    at least one second input medium which receives ambient input from at least one source separate from the speech input; and
    an arrangement for reconciling the speech input with the ambient input so as to provide clean speech output, wherein the reconciling arrangement comprises a filtering arrangement which filters at least one signal associated with the ambient input.

2. The apparatus according to claim 1, wherein said filtering arrangement comprises a filter estimating arrangement which provides parameters for filtering at least one signal associated with the ambient input.

3. The apparatus according to claim 2, wherein said filter estimating arrangement is adapted to accept ambient input at an earlier time to generate the parameters for filtering at least one signal associated with ambient input at a later time.

4. The apparatus according to claim 1, further comprising at least one digitizer which digitizes the speech input prior to its being reconciled with the ambient speech input.

5. The apparatus according to claim 1, further comprising at least one digitizer which digitizes the ambient input prior to reconciling the speech input with the ambient input.

6. The apparatus according to claim 1, wherein said at least one source separate from the speech input comprises at least one loudspeaker.

7. The apparatus according to claim 6, wherein said at least one loudspeaker comprises at least one automobile loudspeaker.

8. A program storage device readable by machine, tangibly embodying a program of instructions executable by the machine to perform method steps for providing speech recognition, said method comprising the steps of:
    receiving speech input;
    receiving ambient input from at least one source separate from the speech input; and
    reconciling the speech input with the ambient input so as to provide clean speech output, wherein said reconciling step comprises filtering at least one signal associated with the ambient input.

9. A method of providing speech recognition, said method comprising the steps of:
    receiving speech input;
    receiving ambient input from at least one source separate from the speech input; and
    reconciling the speech input with the ambient input so as to provide clean speech output, wherein said reconciling step comprises filtering at least one signal associated with the ambient input.

10. The method according to claim 9, wherein said filtering step comprises providing parameters for filtering at least one signal associated with the ambient input.

11. The method according to claim 10, wherein said step of providing parameters comprises accepting ambient input at an earlier time to generate the parameter for filtering at least one signal associated with ambient input at a later time.

12. The method according to claim 9, further comprising the step of digitizing the speech input prior to said reconciling step.

13. The method according to claim 9, further comprising the step of digitizing the ambient input prior to said reconciling step.

14. The method according to claim 9, wherein the at least one source separate from the speech input comprises at least one loudspeaker.

15. The method according to claim 14, wherein the at least one loudspeaker comprises at least one automobile loudspeaker.

* * * * *